US012097436B2

(12) United States Patent
Neuenfeldt et al.

(10) Patent No.: US 12,097,436 B2
(45) Date of Patent: Sep. 24, 2024

(54) INFORMATION PROCESSING DEVICE (71) Applicant: Sony Interactive Entertainment Inc., Tokyo (JP)

(72) Inventors: Benedikt Neuenfeldt, Tokyo (JP); Yohei Nishikawa, Tokyo (JP); Takahisa Ishikawa, Tokyo (JP); Akihiko Kusumoto, Tokyo (JP); Nobukazu Koyama, Tokyo (JP); Masahiro Fujihara, Tokyo (JP); Steven Trombetta, San Francisco, CA (US); Adil Sherwani, Oakland, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 213 days.

(21) Appl. No.: 17/436,830

(22) PCT Filed: Mar. 18, 2020

(86) PCT No.: PCT/JP2020/012016
§ 371 (c)(1),
(2) Date: Sep. 7, 2021

(87) PCT Pub. No.: WO2020/196167
PCT Pub. Date: Oct. 1, 2020

(65) Prior Publication Data
US 2022/0176256 A1 Jun. 9, 2022

Related U.S. Application Data (60) Provisional application No. 62/823,034, filed on Mar. 25, 2019.

(51) Int. Cl.
A63F 13/85 (2014.01)
A63F 13/35 (2014.01)
A63F 13/497 (2014.01)

(52) U.S. Cl.
CPC .............. *A63F 13/85* (2014.09); *A63F 13/35* (2014.09); *A63F 13/497* (2014.09)

(58) Field of Classification Search
CPC ........ A63F 13/85; A63F 13/35; A63F 13/497; A63F 13/493; A63F 13/86; H04N 5/76; H04N 9/8205; H04N 21/44213
(Continued)

(56) References Cited

U.S. PATENT DOCUMENTS 9,661,062 B2    5/2017  Tsukamoto
9,875,192 B1*   1/2018  Allen .................. G06F 9/45558
(Continued)

FOREIGN PATENT DOCUMENTS

JP    2014026501 A    2/2014
JP    2014092991 A    5/2014
(Continued)

OTHER PUBLICATIONS

Decision to Grant a Patent for corresponding JP Application No. 2021-509260, 4 pages, dated Sep. 22, 2022.
(Continued)

Primary Examiner — Michael A Cuff
(74) Attorney, Agent, or Firm — Matthew B. Dernier, Esq.

(57) ABSTRACT

A first ring buffer records a game moving image by game software currently being executed, together with time information. In a case where an event is generated in a game, an event information acquiring part acquires event information including an event code that identifies the generated event, from the game software. A second ring buffer records therein the acquired event information together with the time information synchronized with the first ring buffer.

4 Claims, 6 Drawing Sheets (58) Field of Classification Search
USPC .......................................................... 463/42
See application file for complete search history.

(56) References Cited

U.S. PATENT DOCUMENTS

| | | | |
|---|---|---|---|
| 10,016,689 B2 | 7/2018 | Lucas | |
| 10,034,032 B2 | 7/2018 | Kunigita | |
| 10,376,781 B2* | 8/2019 | Marr | H04L 65/1089 |
| 10,384,125 B2 | 8/2019 | Kurabayashi | |
| 10,486,070 B2 | 11/2019 | Fukuda | |
| 10,516,724 B2 | 12/2019 | Takaichi | |
| 10,525,347 B2* | 1/2020 | Gary | A63F 13/86 |
| 10,616,651 B2* | 4/2020 | Khazanov | H04N 21/84 |
| 10,904,018 B2* | 1/2021 | Iwamoto | H04L 12/00 |
| 11,000,771 B1* | 5/2021 | Boocher | A63F 13/35 |
| 11,013,998 B2* | 5/2021 | Nishikawa | A63F 13/355 |
| 11,090,568 B1* | 8/2021 | Mattar | A63F 13/63 |
| 11,351,466 B2* | 6/2022 | Condrey | A63F 13/63 |
| 2009/0131177 A1* | 5/2009 | Pearce | A63F 13/30 |
| | | | 463/43 |
| 2014/0032662 A1 | 1/2014 | Tsukamoto | |
| 2014/0179424 A1 | 6/2014 | Perry | |
| 2014/0228112 A1 | 8/2014 | Laakkonen | |
| 2015/0138406 A1* | 5/2015 | Sokeila | H04N 23/45 |
| | | | 348/262 |
| 2015/0281325 A1 | 10/2015 | Takaichi | |
| 2016/0158656 A1 | 6/2016 | Condrey | |
| 2017/0007929 A1 | 1/2017 | Fukuda | |
| 2017/0105029 A1 | 4/2017 | Kunigita | |
| 2017/0182415 A1 | 6/2017 | Fukuda | |
| 2017/0282071 A1 | 10/2017 | Kurabayashi | |
| 2018/0001216 A1 | 1/2018 | Bruzzo | |
| 2018/0088804 A1* | 3/2018 | Mummidi | G06F 3/0625 |

FOREIGN PATENT DOCUMENTS

| | | |
|---|---|---|
| JP | 2015058072 A | 3/2015 |
| JP | 2015198404 A | 11/2015 |
| JP | 2016116096 A | 6/2016 |
| JP | 2016116196 A | 6/2016 |
| WO | 2015129077 A1 | 9/2015 |

OTHER PUBLICATIONS

Extended European Search Report for corresponding EP Application No. 20779342.3, 10 pages, dated Nov. 7, 2022.
International Search Report for corresponding PCT Application No. PCT/JP2020/012016, 5 pages, dated Jun. 23, 2020.
The First Office Action for corresponding CN Application No. 202080022706.1, 16 pages, dated Dec. 7, 2023.

* cited by examiner

INFORMATION PROCESSING DEVICE

TECHNICAL FIELD

The present invention relates to a technique of recording a game moving image.

BACKGROUND ART

When a user posts moving image data to a moving image sharing website, the user adds metadata such as a title of and a comment for the moving image to the moving image data. Moreover, when a user views a moving image on a moving image sharing website, the user inputs search keywords and selects a moving image from a moving image list that is retrieved from the moving image sharing website.

With a moving image sharing service in the past, a user cannot easily reach the moving image that is desired by the user. This is because, when the user searches for the moving image, inputting appropriate search keywords is difficult and no appropriate metadata is added to each of the moving images posted to the moving image sharing website. The moving image sharing website cannot therefore provide the moving image that matches with the needs of the user even when the moving image sharing website accumulates therein many moving images.

PTL 1 discloses an information processing device including a recoding part that records therein moving image data by game software currently being executed, a metadata acquiring part that acquires metadata indicating an execution state of the game software, and a content producing part that extracts, as content data, game moving image data from a starting point to an ending point, of the game moving image data recorded in the recording part. The content producing part refers to time information that indicates a timing at which the metadata is acquired, and adds the metadata collected in an extraction time period from the starting point to the ending point to the content data. In addition, the time information of the metadata is used with the purpose of specifying the metadata collected in the extraction time period, and is not added to the game moving image data (the content data). When the content data is uploaded on a distribution server, the added metadata is used in searching for the content.

CITATION LIST

Patent Literature

[PTL 1] JP 2015-198404A

SUMMARY

Technical Problems

While playing a game, a user may desire to view a game moving image that relates to the user's play scene. At this time, when a reproduction time period of the game moving image distributed from a moving image distribution server is long, a long time is taken for scouting out the scene that the user desires to view and it is therefore preferred that a mechanism be present that enables a jump to a desired scene. Moreover, in respect of prevention of spoilers, it is preferred that a mechanism be present that can specify a spoiler section that corresponds to the play situation of the user in the game moving image.

An object of the present invention is to provide a technique that is necessary for realizing the above mechanisms.

Solution to Problems

To solve the above problems, an information processing device in one mode of the present invention includes a first ring buffer that records a game moving image by game software currently being executed, together with time information, an event information acquiring part that, in a case where an event is generated in a game, acquires event information including an event code identifying the generated event, from the game software, and a second ring buffer that records the acquired event information together with the time information synchronized with the first ring buffer.

In addition, any combination of the above constituent elements and any expressions of the present invention converted among a method, a device, a system, a recording medium, a computer program, and the like are also valid as aspects of the present invention.

DESCRIPTION OF EMBODIMENT

In an information processing system of an embodiment, a user plays game software installed in an information processing device (a console game). When an event is generated in a game, the game software outputs event information including an event code that identifies the generated event, to a side of system software. The event is generated when a change occurs in progression of play of the game, when a change occurs in behavior of a player character or a game character, or the like.

The information processing device causes the game moving image to be output from a television or the like, and concurrently therewith automatically records the game moving image in the background, and the user can upload the recorded game moving image to a distribution server. When the user manually determines a starting point and an ending point of the recorded game moving image, the information processing device extracts the game moving image spanning from the starting point to the ending point, and uploads the extracted game moving image to the distribution server. At this time, the information processing device transmits event information acquired between the starting point and the ending point to an event server together with time information of the event information. When a search server accepts a search request from a viewing user, the search server refers to time series data having the events generated between the starting point and the ending point of the game moving image and their generation times correlated with each other, and searches for a game moving image that matches with a play situation of the viewing user.

Figure 1:
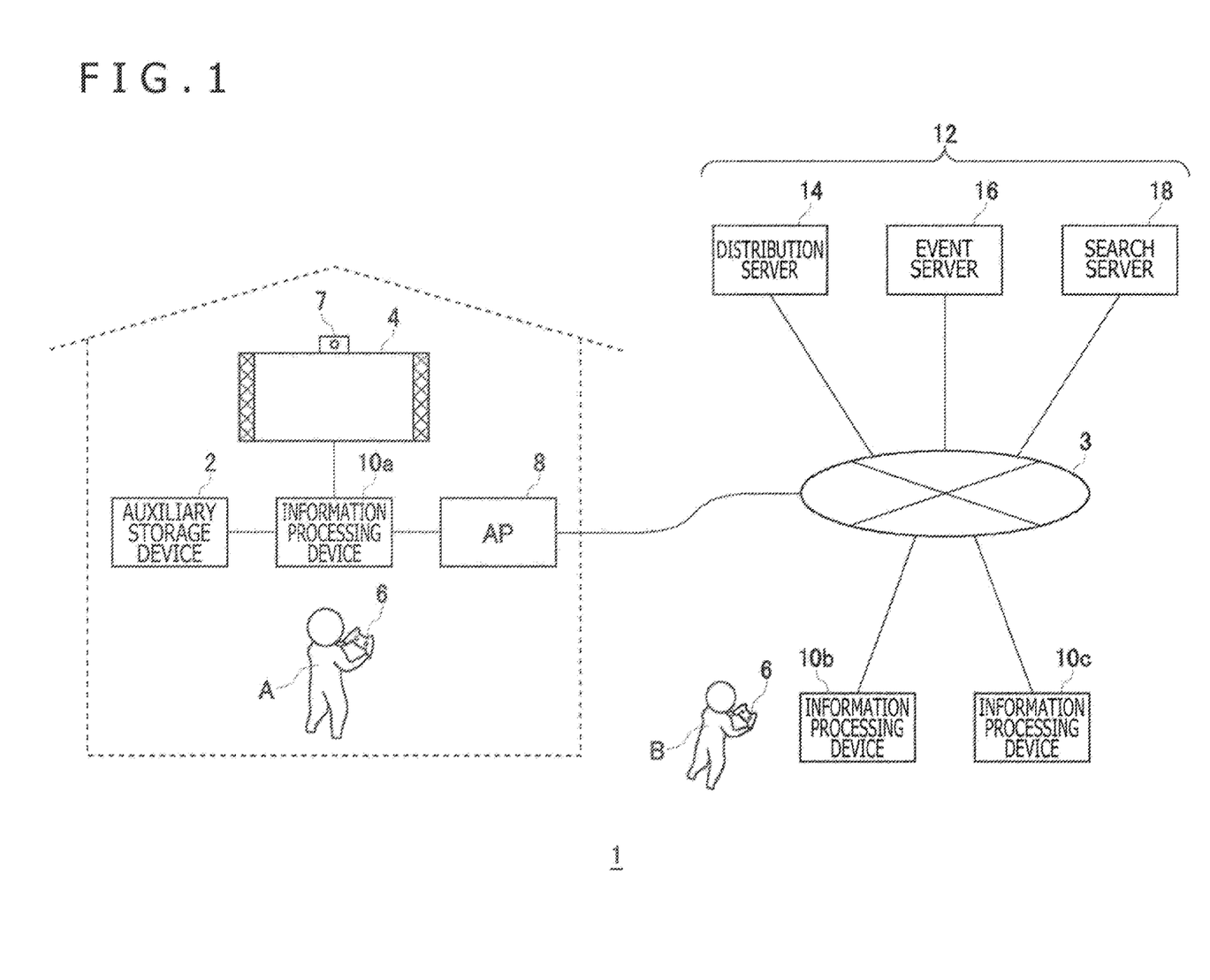
FIG. 1 is a diagram depicting an information processing system according to an embodiment.

FIG. 1 depicts an information processing system 1 according to an embodiment of the present invention. The information processing system 1 includes a plurality of information processing devices 10a, 10b, and 10c (hereinafter, each referred to as "information processing device 10" in a case where these are each not especially discriminated from each other), and a content server 12, and these are connected to each other through a network 3 such as the Internet or a local area network (LAN). An access point (hereinafter, referred to as "AP") 8 has functions of a wireless access point and a router, and the information processing device 10 is connected to the AP 8 wirelessly or through a wire to be communicably connected to the content server 12 present in the network 3.

The content server 12 provides a content sharing service for game moving images and the like, and is depicted in this drawing as a concept that consolidates therein a distribution server 14, an event server 16, and a search server 18 with each other. The distribution server 14 receives uploading of a game moving image from a distribution user, and distributes the game moving image to a viewing user. The event server 16 converts event information transmitted from the information processing device 10 into time series data that is suitable for a search. When the search server 18 receives a moving image search request from a viewing user, the search server 18 searches for the game moving image to be distributed from the distribution server 14 on the basis of the time series data of the event.

The distribution server 14, the event server 16, and the search server 18 may each be configured as an individual server and may each communicate with each other through the network 3 while these servers may be formed integrally with each other. Moreover, the distribution server 14 and the event server 16 may be formed integrally with each other, the distribution server 14 and the search server 18 may be formed integrally with each other, or the event server 16 and the search server 18 may be formed integrally with each other.

The information processing device 10 is connected wirelessly or through a wire to an input device 6 that is operated by the user, and the input device 6 outputs information operated by the user to the information processing device 10. When the information processing device 10 receives operation information from the input device 6, the information processing device 10 causes the processing for the system software and the game software to reflect the operation information and causes an output device 4 to output the processing result. In the information processing system 1, the information processing device 10 is a game device (a game console) that executes a game, and the input device 6 may be an apparatus that supplies the operation information of the user to the information processing device 10, such as a game controller. In addition, the input device 6 may be an input interface such as a keyboard or a mouse.

An auxiliary storage device 2 is a large-capacity storage device such as a hard disc drive (HDD) or a flash memory, and may be an external storage device that is connected to the information processing device 10 by a universal serial bus (USB) or the like or may be a built-in storage device. The output device 4 may be a television including a display that outputs an image and a speaker that outputs a sound or may be a computer display. The output device 4 may be connected to the information processing device 10 by a wired cable or may be connected thereto by wireless.

A camera 7 that is an imaging device is disposed in the vicinity of the output device 4 and images a space surrounding the output device 4. FIG. 1 depicts an example where the camera 7 is attached to an upper portion of the output device 4 while the camera 7 may be arranged on a side portion or a lower portion of the output device 4 and in any case, the camera 7 is arranged at a position at which the camera 7 can image the user who is positioned in front of the output device 4. The camera 7 may be a stereo camera.

The distribution server 14 provides a service to share the game image uploaded from the information processing device 10. The distribution server 14 has functions of distributing the game images that are accumulated therein, in accordance with a request from the viewing user and of broadcasting a game image that is provided thereto in real time from the distribution user. A plurality of the distribution servers 14 may be present. The image distribution service provided by the distribution server 14 may limit the users who receive the service to registered members or may be open to the public.

The event server 16 acquires an event information group that is correlated with the uploaded game moving image from the information processing device 10. The event server 16 converts the event information group into event time series data that is suitable for the search. The event time series data is a data string having therein the events generated between the starting time to the ending time of the game moving image and the generation times thereof, correlated with each other. The event server 16 provides the event time series data to the search server 18.

When the search server 18 receives a search request for a game moving image from the information processing device 10 of the viewing user, the search server 18 refers to the event time series data and executes a search process for the game moving image accumulated in the content server 12. The search request includes state information that indicates a play situation of the game of the viewing user, and the search server 18 searches for a game image to be distributed, from the relation between the state information and the even time series data.

Figure 2:
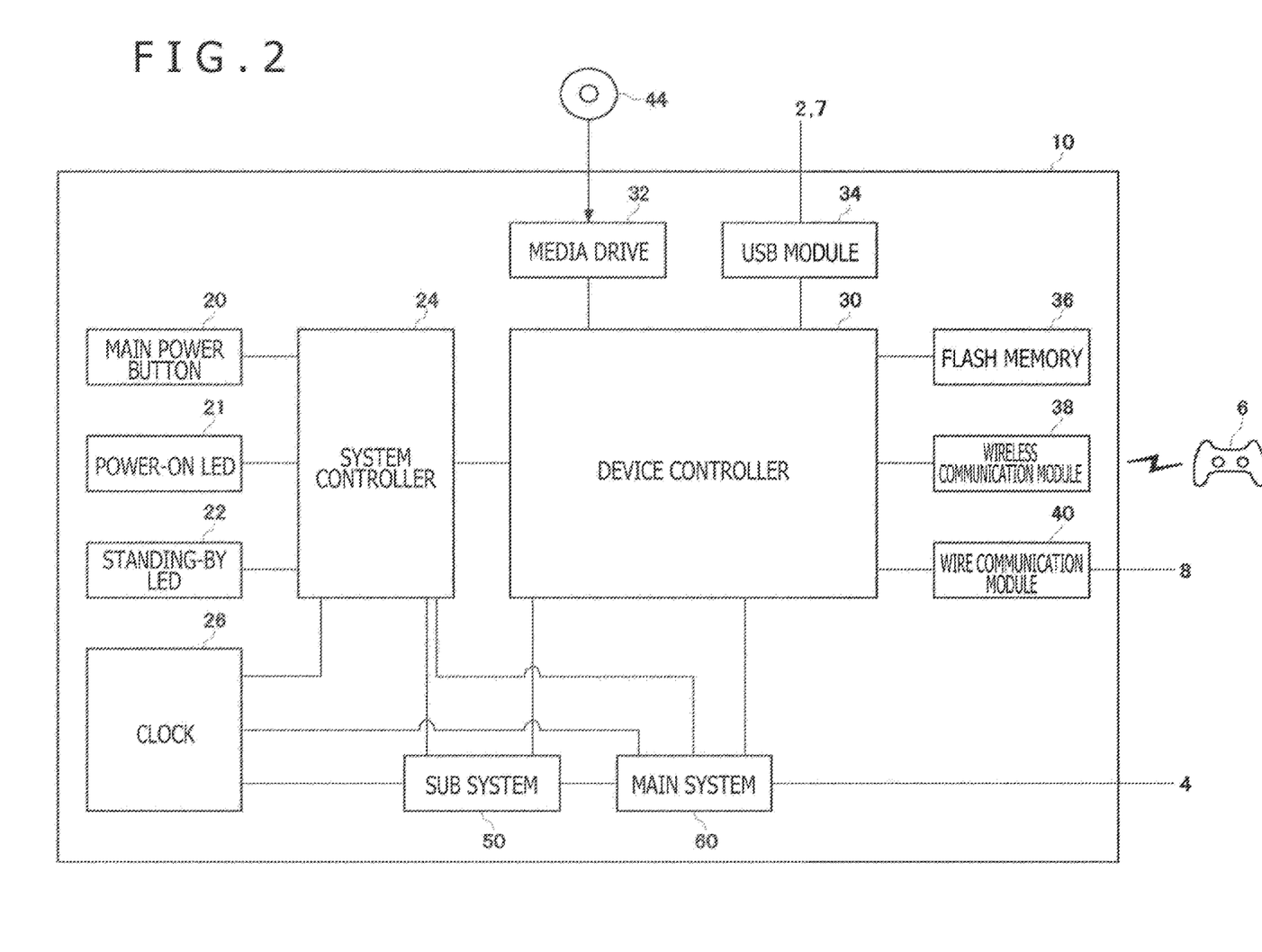
FIG. 2 is a diagram depicting a hardware configuration of an information processing device.

FIG. 2 depicts a hardware configuration of the information processing device 10. The information processing device 10 includes a main power button 20, a power-ON light-emitting diode (LED) 21, a standing-by LED 22, a system controller 24, a clock 26, a device controller 30, a media drive 32, a USB module 34, a flash memory 36, a wireless communication module 38, a wire communication module 40, a sub system 50, and a main system 60.

The main system 60 includes a main central processing unit (CPU), a memory and a memory controller that serve as a main storage device, a graphics processing unit (GPU), and the like. The GPU is used mainly for arithmetic processing of a game program. The main CPU has functions of starting up an operating system (OS) and of executing a game program installed in the auxiliary storage device 2 in the environment provided by the OS. The sub system 50 includes a sub CPU, a memory and a memory controller that serve as a main storage device, and the like, and includes no GPU.

The main CPU has a function of executing a game program installed in the auxiliary storage device 2 or a read-only memory (ROM) medium 44 while the sub CPU does not have such a function. The sub CPU however has a function of accessing the auxiliary storage device 2 and a function of transmitting and receiving data to/from a server device 5. The sub CPU includes only these limited processing functions and can therefore operate with a low power consumption compared to that of the main CPU. These functions of the sub CPU are executed when the main CPU is in its standing-by state.

The main power button 20 is an input part on which an operational input from the user is executed, is disposed on the front face of a housing of the information processing device 10, and is operated to turn on or turn off the power supply to the main system 60 of the information processing device 10. The power-ON LED 21 lights up when the main power button 20 is turned on, and the standing-by LED 22 lights up when the main power button 20 is turned off. The system controller 24 detects pressing down of the main power button 20 by the user.

The clock 26 is a real-time clock, produces current day-and-time information, and supplies the day-and-time information to the system controller 24, the sub system 50, and the main system 60.

The device controller 30 is configured as a large-scale integrated circuit (LSI) that executes delivery and reception of information among devices, like a south-bridge. As depicted, to the device controller 30, connected are devices such as the system controller 24, the media drive 32, the USB module 34, the flash memory 36, the wireless communication module 38, the wire communication module 40, the sub system 50, and the main system 60. The device controller 30 absorbs a difference in electric property and a difference in data transfer speeds among the devices, and controls the timing for data transfer.

The media drive 32 is a drive device to which the ROM medium 44 having application software such as a game and license information recorded therein is attached to drive the ROM medium 44, and that reads programs and data from the ROM medium 44. The ROM medium 44 is a recording medium dedicated to reading such as an optical disc, a magneto-optical disc, or Blu-ray Disc.

The USB module 34 is a module connected to an external apparatus by a USB cable. The USB module 34 may be connected to the auxiliary storage device 2 and the camera 7 each by a USB cable. The flash memory 36 is an auxiliary storage device included in an internal storage. The wireless communication module 38 wirelessly communicates with, for example, the input device 6 using a communication protocol such as the Bluetooth (a registered trademark) protocol or the Institute of Electrical and Electronic Engineers (IEEE) 802.11 protocol. The wire communication module 40 communicates through a wire with an external apparatus and is connected to the network 3 through, for example, the AP 8.

Figure 3:
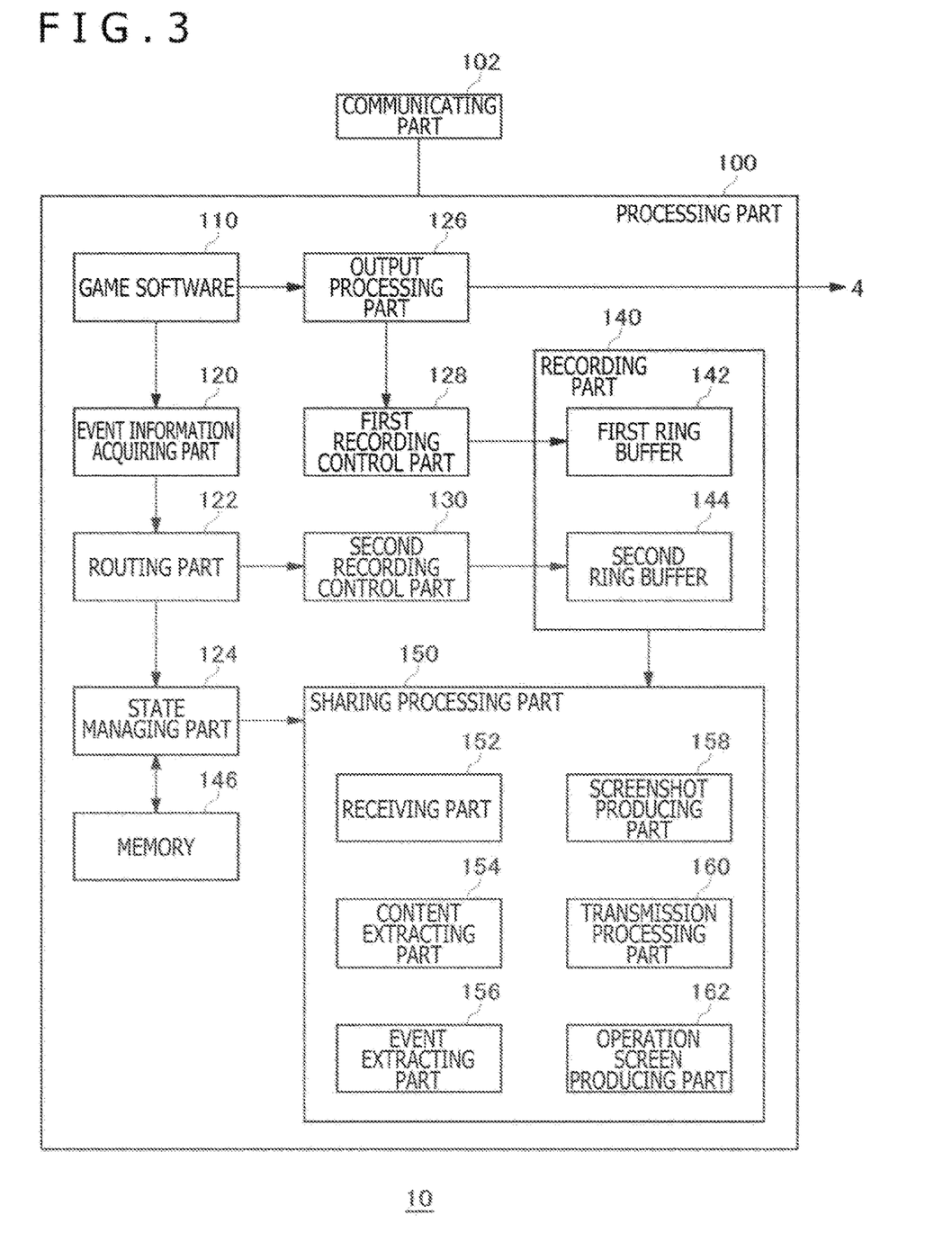
FIG. 3 is a diagram depicting functional blocks of the information processing device.

FIG. 3 depicts functional blocks of the information processing device 10. The information processing device 10 includes a processing part 100 and a communicating part 102. The processing part 100 includes game software 110, an event information acquiring part 120, a routing part 122, a state managing part 124, an output processing part 126, a first recording control part 128, a second recording control part 130, a recording part 140, a memory 146, and a sharing processing part 150. The recording part 140 includes a first ring buffer 142 and a second ring buffer 144. The sharing processing part 150 includes a receiving part 152, a content extracting part 154, an event extracting part 156, a screenshot producing part 158, a transmission processing part 160, and an operation screen producing part 162. The communicating part 102 is expressed as a configuration that has both of the functions of the wireless communication module 38 and the wire communication module 40 depicted in FIG. 2, the wireless communication module 38 is in charge of communication with the input device 6, and the wire communication module 40 is in charge of communication with the content server 12.

In FIG. 3, the elements depicted as the functional blocks that execute various processes can each include a circuit block, a memory, and other LSIs with regard to hardware, or are each be realized by a program loaded on a memory with regard to software. Those skilled in the art should therefore understand that these functional blocks can be realized in each of various forms by only the hardware, only the software, or a combination of these, and the form is not limited to any of the above.

The game software 110 includes at least a game program, image data, audio data, and a configuration file. The game program receives the operation information of the input device 6 by the user, and executes an arithmetic process of moving a player character in a virtual space. The output processing part 126 produces image data and audio data of the game, and causes the output device 4 to output the image data and the audio data. The output processing part 126 may include a graphics processing unit (GPU) that executes a rendering process and the like.

When an event set in advance is generated in the progression of the game, the game program produces event information including an event code that identifies the generated event and outputs the event information to the event information acquiring part 120. A game developer may plant various events in the game as follows.

Referring to a task, a goal, an action, and the like that the player can execute in the game each as "activity," when a player starts an activity, an event representing that the activity is started is generated and, when the player ends the activity, an event representing that the activity is ended is generated. For example, for an activity of a "combat" with an enemy character, when a player starts a combat, a combat start event is generated, and when the player ends the combat, a combat end event is generated.

An event code is assigned to each event, and the game program produces event information having therein game data that indicates the state of the game at the time of the generation of the event, added to the event code that identifies the generated event. The game program may cause the game data to include the location of the generation of the event, information regarding the opponent, and the like. For example, regarding the combat start event, the game data may include at least information specifying a scene number in the game and information indicating the location of the combat. Regarding the combat end event, the game data may include information specifying the scene number in the game, information indicating the location of the combat, information indicating whether or not the activity is completed, and an experience point of the player that is increased by the ending of the combat. In addition, the activity is completed when the final purpose of this activity (such as, for example, to beat down the last boss or to annihilate the enemy) is accomplished.

Moreover, during the play of the game, when the player procures a weapon, an event representing that the player procures the weapon is generated. When the player uses the weapon, an event representing that the player uses the weapon is generated, and when a weapon is used by an enemy character to the player, an event representing that the weapon is used to the player is generated. The game program produces event information in which the game data such as the type of the weapon, and the location where the weapon is procured or used, is added to the event code, and outputs the event information to the event information acquiring part 120. In this manner, the game developer may define various events and may incorporate the events in the game.

The configuration file of the game software 110 describes a list of event codes that are necessary for managing the play situation of the user. The information necessary for managing the play situation in the embodiment includes the event codes relating to the activity but includes no event code relating to the weapon. In addition, which type of event is used to manage the play situation of the user depends on a management policy for the play situation, and the events relating to the weapon and other types of event can also be caused to be reflected on the management of the play situation of the user.

The list of the event codes is provided to the routing part 122 before the play of the game is started. The event information acquiring part 120 acquires the event information from the game software 110 and delivers the event information to the routing part 122. When the event information is delivered to the routing part 122, the routing part 122 supplies all pieces of event information to the second recording control part 130 and supplies the pieces of event information necessary for the management of the play situation of the user to the state managing part 124 in accordance with the event code list.

The state managing part 124 records the latest state information that indicates the play situation of the user, in the memory 146. The state managing part 124 updates the state information on the basis of the event information. For example, the state managing part 124 may manage the play situation of the user using the following pieces of state information.

Activity_A
  This indicates an activity that has been most recently started.
Activity_B
  This indicates an activity that has been played so far.
Activity_C
  This indicates an activity that has been cleared so far.
Activity_D
  This indicates an activity capable of being played.
Activity_E
  This indicates an activity unable to be played.

Each of all the above pieces of state information is managed using identification information of the activity (activity identification (ID)). The state managing part 124 manages "Activity_A," "Activity_B," "Activity_C," "Activity_D," and "Activity_E" using the activity IDs by acquiring in advance a conversion table to convert the event codes into the activity IDs, from the configuration file. When the event information relating to an activity is supplied from the routing part 122 to the state managing part 124, the state managing part 124 updates the state information. For example, when a start event for a new activity is supplied, the state managing part 124 updates "Activity_A" and "Activity_B." Moreover, when an activity having been played so far is completed, the state managing part 124 updates "Activity_C."

In the information processing device 10 of the embodiment, the output processing part 126 produces the image data and the audio data of the game, causes the output device 4 to output the image data and the audio data, and supplies the image data and the audio data also to the first recording control part 128. Hereinafter, the image data and the audio data of the game will simply be referred to as "game moving image" or "game moving image data." The information processing device 10 has a function of recording in the background the game moving image output from the output device 4, and the first recording control part 128 records the game moving image data together with the time information (a time stamp) in the first ring buffer 142.

The first ring buffer 142 is produced by setting a first start address and a first end address of a storage area of the auxiliary storage device 2. This ring buffer area may be set in advance when the information processing device 10 is shipped. The first recording control part 128 records the game moving image by the currently executed game software, that is produced by the output processing part 126, together with the time stamp in the first ring buffer 142.

The first recording control part 128 records pieces of the image data in the order of the addresses determined in advance from the first start address in the first ring buffer 142, and when the first recording control part 128 records the pieces of the image data up to the first end address, returns to the first start address to record by overwriting, and repeats this processing. For example, the first ring buffer 142 is set such that the first ring buffer 142 records a 20-minute game moving image, and the time information (the time stamp) is imparted to each of the recorded game moving image. Recording the game moving image in the first ring buffer 142 in the background enables the user to cut out the play moving image for the latest 20 minutes and to upload the cut-out play moving image to the distribution server 14.

When an event is generated in the game, the event information acquiring part 120 acquires the event information including the event code that identifies the generated event from the game software 110, and supplies the event information to the routing part 122. The routing part 122 sends all the pieces of event information supplied thereto to the second recording control part 130, and the second recording control part 130 records the pieces of event information together with the time information (the time stamp) in the second ring buffer 144.

The second ring buffer 144 is produced by setting a second start address and a second end address of a storage area of the auxiliary storage device 2. Similar to the first ring buffer 142, this ring buffer area may be set in advance when the information processing device 10 is shipped. The second recording control part 130 records the pieces of event information in the order of the addresses determined in advance from the second start address in the second ring buffer 144, and when the second recording control part 130 records the pieces of event information up to the second end address, returns to the second start address to record by overwriting, and repeats this processing. The second ring buffer 144 is set such that the second ring buffer 144 records the pieces of event information for the same time period as that of the first ring buffer 142 (for example, 20 minutes), and the time information (the time stamp) is imparted to each of the recorded pieces of event information. The time stamps recorded in the second ring buffer 144 is synchronized with the time stamps recorded in the first ring buffer 142. The game image is therefore recorded in the first ring buffer 142 at the same timing, and when the event information is recorded in the second ring buffer 144, the same time stamps are imparted to both thereof.

A procedure for a user A to upload a game moving image to the distribution server 14 during the play of a game will be described below. When the user A presses down a predetermined button (a Share button) of the input device 6, a plurality of options relating to sharing of the game image are displayed on the output device 4.

Figure 4:
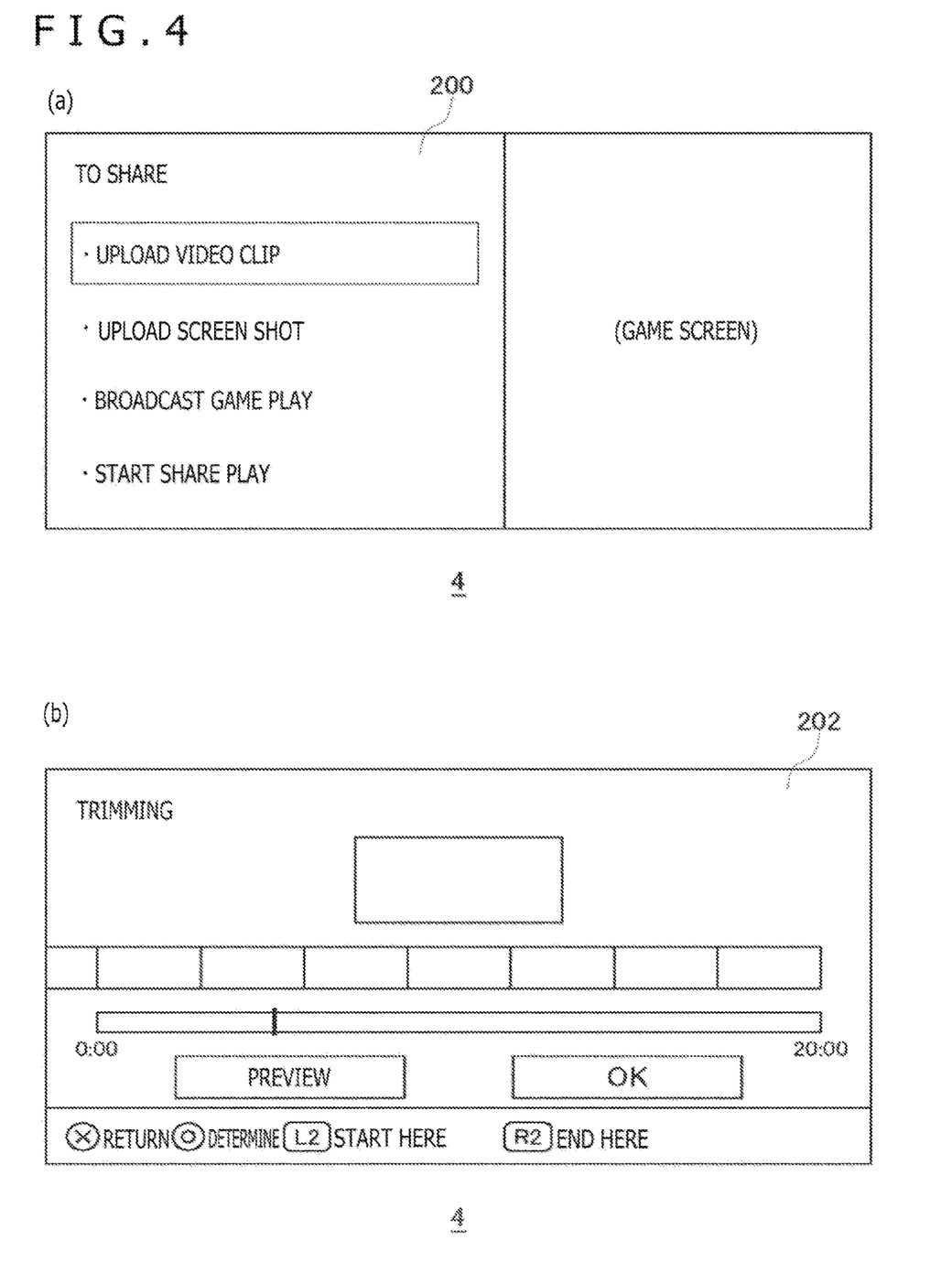
FIG. 4 depict diagrams each depicting a screen example of an output device.

FIG. 4(a) depicts an example of a share menu screen 200 that is displayed being superimposed on a game screen. When the user A operates the Share button disposed on the input device 6 during the play of the game, the receiving part 152 receives the operation information of the Share button, and the operation screen producing part 162 produces the share menu screen 200 to be displayed being superimposed on the game screen. On the share menu screen 200, indicated are:

Upload a video clip;
Upload a screenshot;
Broadcast a game play; and
Start a share play, and four options relating to game image sharing. At this time, the progression of the game is temporarily discontinued, and the first recording control part 128 and the second recording control part 130 concurrently discontinues writing into the first ring buffer 142 and the second ring buffer 144, respectively. Recording for 20 minutes before the operation of the Share button is thereby stored in each of the first ring buffer 142 and the second ring buffer 144.

When the share menu screen 200 is displayed, the operation information of the input device 6 is used for the operation of the share menu screen 200. To upload the game moving image, the user A selects "Upload a video clip." The user A thereafter selects the distribution server 14 to upload the game moving image thereto. FIG. 1 depicts only the single distribution server 14 while a plurality of the distribution servers 14 may be present, and in this case, the user A needs to select one or more distribution servers 14. When the user A selects the distribution server 14, the operation screen producing part 162 produces a screen to edit the game moving image.

FIG. 4(b) depicts a trimming editing screen 202. The game moving image for 20 minutes at the longest is recorded in the first ring buffer 142 in the embodiment while, depending on the distribution server 14, the uploading may be permitted only for a game moving image whose time period is shorter than 20 minutes. The user A therefore cuts out the game moving image in such a length capable of being uploaded on the trimming editing screen 202. The user A operates the input device 6 and thereby designates the starting point and the ending point to cut out the game moving image. When the receiving part 152 receives the designation of the starting point and the ending point from the user A, the receiving part 152 notifies the content extracting part 154 and the event extracting part 156 of the designation. The content extracting part 154 extracts the game moving image from the starting point to the ending point together with the time stamps, of the game moving image recorded in the first ring buffer 142, and the event extracting part 156 extracts the event information from the same starting point to the same ending point together with the time stamps, of the pieces of event information recorded in the second ring buffer 144. Hereinafter, the extracted pieces of event information from the starting point to the ending point will be referred to as "event information group." Note that the user A may determine a starting point and an ending point and may cut out the user's favorite play scene regardless of the moving image permissible time period of the distribution server 14.

Figure 5:
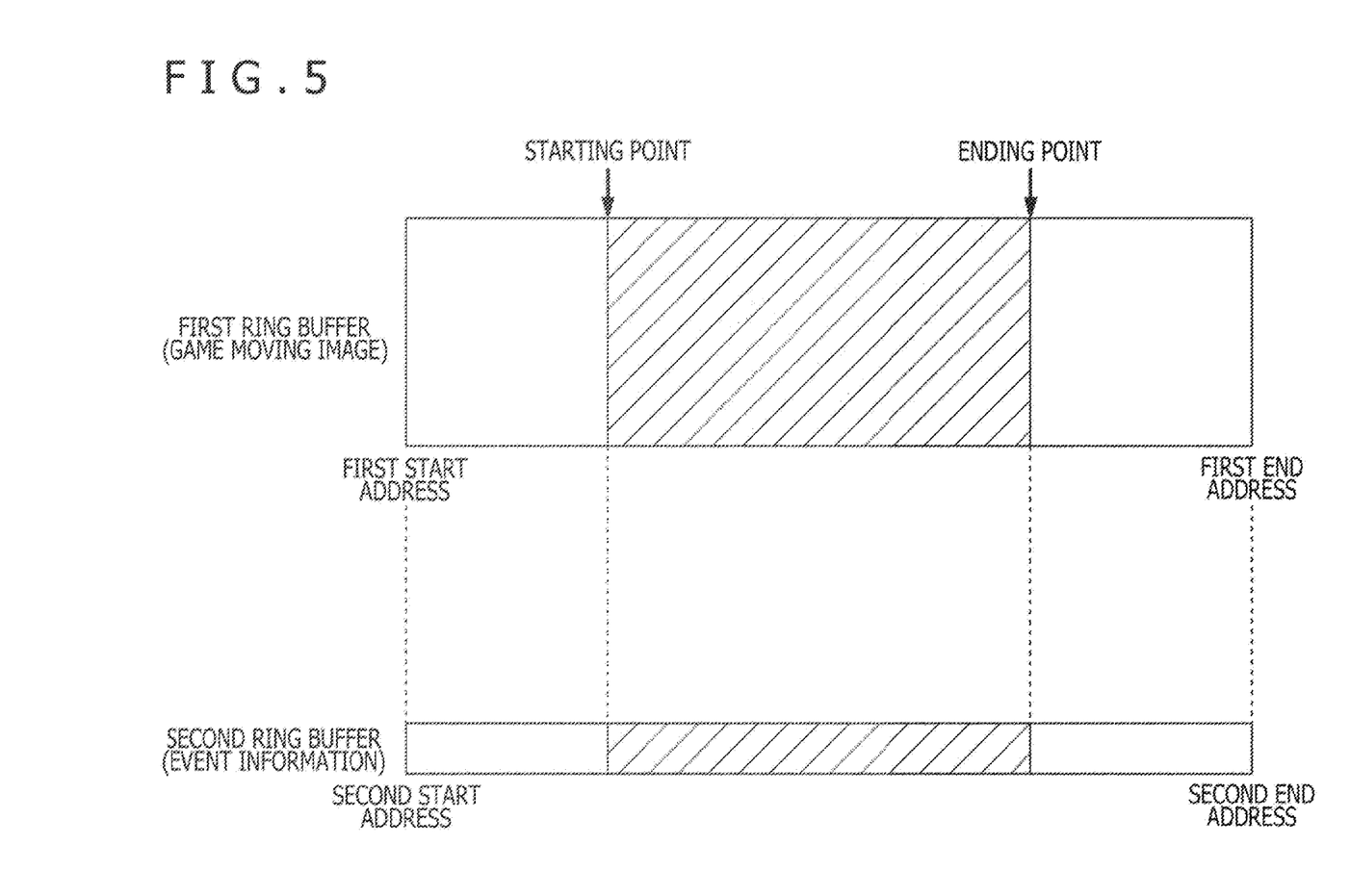
FIG. 5 is a diagram depicting a relation between a game moving image and event information.

FIG. 5 depicts a relation between the extracted game moving image and the pieces of event information. Because the first ring buffer 142 and the second ring buffer 144 set the time stamps to be common thereto, the timelines of the extracted game moving image and the extracted pieces of event information can be caused to match with each other. The content extracting part 154 adds at least the game identification information (the game ID) and the content identification information (the content ID) as attribute information to the extracted game moving image. Note that the information to specify the user A may also be added to the extracted game moving image. A content ID needs to be a unique one in the information processing system 1. The content extracting part 154 provides the content ID to the event extracting part 156, and the event extracting part 156 adds the game ID and the content ID to the extracted event information group as the attribute information.

The transmission processing part 160 transmits the game moving image extracted by the content extracting part 154 to the distribution server 14. The distribution server 14 has game moving images uploaded thereto from the information processing devices 10 of each of a plurality of users, and users who desire to have the game moving image to be distributed thereto access the distribution server 14 and view the game moving image.

The transmission processing part 160 transmits the event information group extracted by the event extracting part 156 to the event server 16. While the event information group is a set of combinations of an event code and game data, since the event code and the game data are defined by the game developer, the event code and the game data are different for each game. The event server 16 therefore converts the event codes and the pieces of game data included in the event information group into the event codes and the pieces of game data that are commonly used by the content server 12, using the conversion table provided from the game developer.

This conversion process will be described. When the player starts an activity, an activity start event is generated. For example, in a game X, the event code of the activity start event may be "missionStart," and in a game Y, the event code of the activity start event may be "taskStart" while the event server 16 converts the event code of the activity start event into "START." The event server 16 therefore retains a table that converts "missionStart" into "START" with respect to the game X, and retains a table that converts "taskStart" into "START" with respect to the game Y. In this manner, the event server 16 converts the pieces of event information of all the games into the event codes and the pieces of game data to be commonly used by the content server 12. Referring to the event codes and the pieces of game data after the conversion as "event time series data," the scene number in the activity included in the game data before the conversion is converted into the activity ID by a conversion table. The event server 16 supplies the event time series data to the search server 18, and the search server 18 analyzes the event time series data and can thereby specify the type and the generation time of the event generated in the game moving image.

The description above is the procedure for the user A to transmit the game moving image and the event information group to the content server 12. A procedure for a user B operating the information processing device 10b to access the content server 12 and view a game moving image will be described below. In the information processing system 1, during the play of the game by the user B, the user B can receive distribution of a game moving image that matches with the current play situation, by executing a predetermined operation.

In the information processing device 10b of the user B, similarly, the state managing part 124 manages the state information indicating the play situation of the user B in the memory 146. "Activity_A," "Activity_B," "Activity_C," "Activity_D," and "Activity_E" that are the pieces of state information are managed using the activity IDs.

During the play of the game, when the user B executes the predetermined operation, the user B can receive provision of a list of candidates of the game moving image that matches with the current play situation. When the information processing device 10b receives the predetermined operation by the user B, the information processing device 10b transmits a search request for the game moving image to the search server 18. At this time, the information processing device 10b causes the search request to include the game ID currently being played and the state information that is managed by the state managing part 124.

Figure 6:
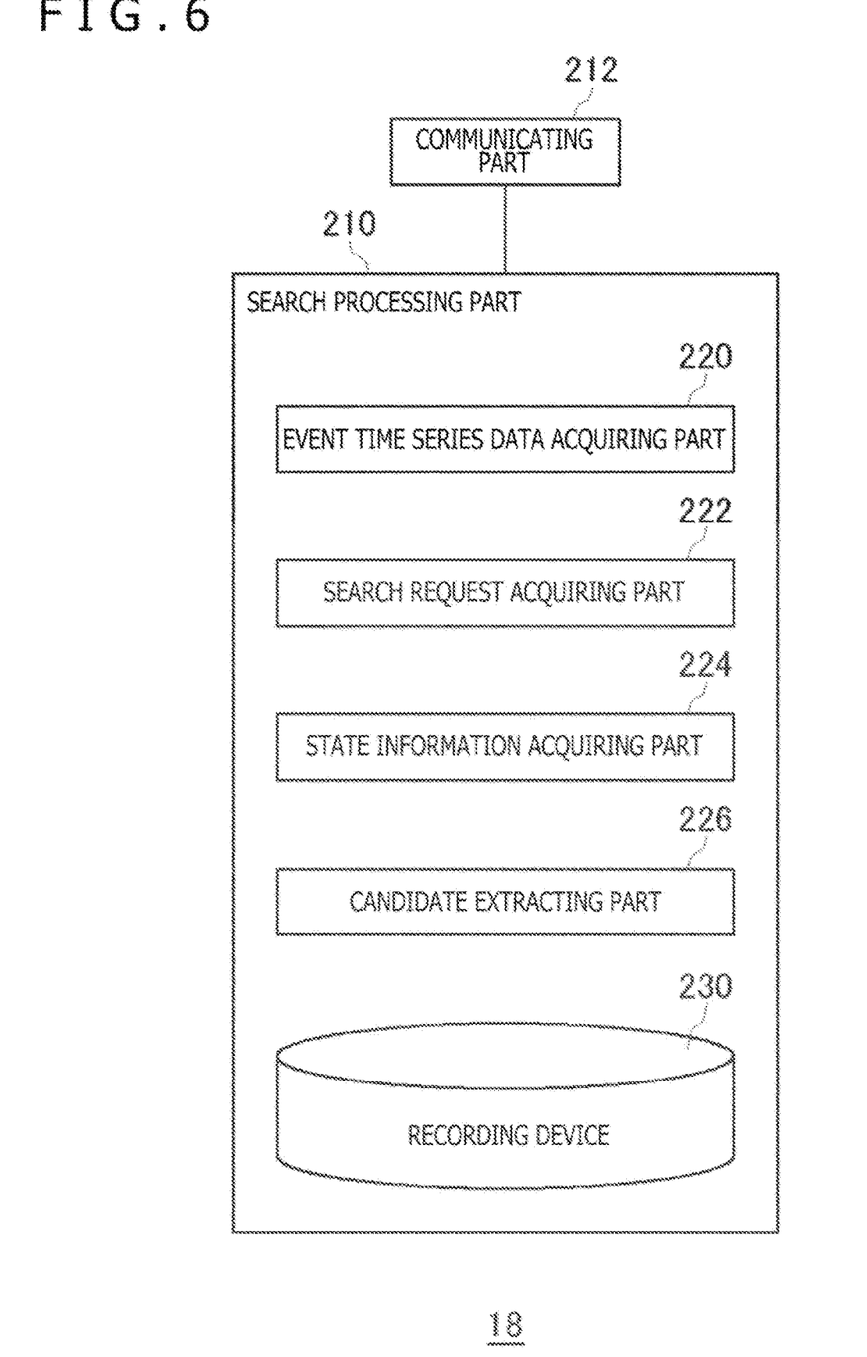
FIG. 6 is a diagram depicting functional blocks of a search server.

FIG. 6 depicts functional blocks of the search server 18. The search server 18 includes a search processing part 210 and a communicating part 212. The search processing part 210 includes an event time series data acquiring part 220, a search request acquiring part 222, a state information acquiring part 224, a candidate extracting part 226, and a recording device 230.

In FIG. 6, elements depicted as the functional blocks that execute various processes can each include a circuit block, a memory, and other LSIs as hardware, or are each be realized by a program loaded on a memory as software. Those skilled in the art should therefore understand that these functional blocks can be realized in each of various forms by only the hardware, only the software, or a combination of these, and the form is not limited to any of the above.

The event time series data acquiring part 220 acquires the event time series data of the game moving image from the event server 16, and stores the event time series data in the recording device 230. It is preferred that, when the event information is transmitted from the information processing device 10 to the event server 16, the event server 16 immediately produce the event time series data and provide the event time series data to the search server 18. The event time series data has the game ID and the content ID added thereto.

The search request acquiring part 222 receives a search request for the game moving image from the information processing device 10b of the user B who is the viewing user. The state information acquiring part 224 acquires the game ID currently being played by the user B and the state information managed regarding this game, from the search request.

The candidate extracting part 226 specifies the event time series data to which the game ID currently being played by the user B is added, and searches for the game moving image that matches with the state information of the user B. Of the state information, the activity ID of "Activity_A" specifies an activity currently being played, and the candidate extracting part 226 may therefore specify the event time series data that includes an end event of the activity indicated by the activity ID of "Activity_A." The game moving image including a video image with which the activity is completed can thereby be specified.

The activity ID included in "Activity_B" indicates an activity that has been played so far. The candidate extracting part 226 may therefore avoid selecting any event time series data that includes the activity ID not included in "Activity_B" from the viewpoint of prevention of spoilers. The activity not having been played so far by the user B is thereby caused to avoid being included in the candidate moving image. When the candidate extracting part 226 specifies a plurality of pieces of event time series data that match with the state information of the user B, the candidate extracting part 226 notifies the distribution server 14 of the content IDs of the plurality of pieces of event time series data. The distribution server 14 specifies the game moving images from the content IDs, and transmits a list of thumbnails of the game moving images to the information processing device 10b. When the user B selects one of the thumbnails, the distribution server 14 distributes the selected game moving image. The user B is thereby enabled to view the game moving image that matches with the current play situation without inputting any search keyword.

For example, in a case where the reproduction time period of the game moving image is long, the game moving image may be adapted to be started at the time position of the start event code of the activity of "Activity_A." Moreover, in a case where a spoiler video image is included in the game moving image, the distribution server 14 may specify the spoiler section and may avoid any distribution of the spoiler section. In this manner, the distribution server 14 can specify a scene to be distributed with priority and a scene that is not distributable, from the event time series data and the state information of the user B.

The process of correlating the event time series data with the uploaded game moving image has been described above.

Referring back to FIG. 4(a), the user A can upload a screenshot. When the user A selects "Upload a screenshot" and captures (or selects) the screenshot to upload the screenshot, the screenshot producing part 158 acquires the screenshot of the game screen. At this time, the screenshot producing part 158 reads at least a portion of the latest state information at the time of acquiring the screenshot from the memory 146 and adds the portion as the metadata to the screenshot image. The screenshot producing part 158 adds the metadata to the screenshot of the game moving image, whereby management is enabled such that no other user can view the screenshot, from the viewpoint of preventing the spoilers.

The present invention has been described above on the basis of the embodiment. This embodiment is exemplary, and those skilled in the art should understand that various modification examples can be made for each of the constituting elements thereof and each of the combinations of the processing processes and such modification examples are within the scope of the present invention.

INDUSTRIAL APPLICABILITY

The present invention is applicable to a technical field in which a game moving image is recorded.

REFERENCE SIGNS LIST

1: Information processing system
10: Information processing device
12: Content server
14: Distribution server
16: Event server
18: Search server
100: Processing part
102: Communicating part
110: Game software
120: Event information acquiring part
122: Routing part
124: State managing part
126: Output processing part
128: First recording control part
130: Second recording control part
140: Recording part
142: First ring buffer
144: Second ring buffer
146: Memory
150: Sharing processing part 152: Receiving part
154: Content extracting part
156: Event extracting part
158: Screenshot producing part
160: Transmission processing part
162: Operation screen producing part
210: Search processing part
212: Communicating part
220: Event time series data acquiring part
222: Search request acquiring part
224: State information acquiring part
226: Candidate extracting part
230: Recording device.

The invention claimed is:

1. An information processing device comprising:
a first ring buffer that records game videos and time information produced in connection with user interaction in a game resulting from game software currently being executed;
an event information acquiring part that, in a case where one or more events are generated in the game resulting from the user interaction, acquires event information including one or more respective event codes identifying the respective one or more events that are generated, from the game software;
a second ring buffer that records the acquired event information together with the time information synchronized with the first ring buffer;
a content extraction unit that extracts a particular game video from a starting point to an ending point, that extracts the time information, from among the game videos recorded in the first ring buffer; and
an event extraction unit configured to extract a subset of the event information for a given event among the one or more events, from the start point to the end point, together with the time information from the event information recorded in the second ring buffer.

2. The information processing device according to claim 1, further comprising: a receiving part that receives designation of the starting point and the ending point from a user.

3. The information processing device according to claim 1, further comprising: a transmission processing part that transmits the extracted game moving image to a first server device and the extracted event information to a second server device.

4. The information processing device according to claim 1, comprising:
a state managing part that updates state information indicating a play situation of a user on a basis of the acquired event information; and
a screenshot producing part that acquires a screenshot of a game screen, wherein
the screenshot producing part adds at least a portion of latest state information at a time of the acquisition of the screenshot as metadata.

* * * * *